United States Patent
Sutani et al.

(10) Patent No.: US 9,762,112 B2
(45) Date of Patent: Sep. 12, 2017

(54) ACTUATOR AND METHOD OF MANUFACTURING ACTUATOR

(71) Applicant: Hitachi Metals, Ltd., Tokyo (JP)

(72) Inventors: Junichi Sutani, Suita (JP); Yoshinobu Nakamura, Suita (JP)

(73) Assignee: Hitachi Metals, Ltd., Tokyo (JP)

( * ) Notice: Subject to any disclaimer, the term of this patent is extended or adjusted under 35 U.S.C. 154(b) by 241 days.

(21) Appl. No.: 14/442,037

(22) PCT Filed: Nov. 25, 2013

(86) PCT No.: PCT/JP2013/081599
§ 371 (c)(1),
(2) Date: May 11, 2015

(87) PCT Pub. No.: WO2014/084156
PCT Pub. Date: Jun. 5, 2014

(65) Prior Publication Data
US 2015/0295485 A1    Oct. 15, 2015

(30) Foreign Application Priority Data

Nov. 30, 2012   (JP) ................................. 2012-262660
Jul. 31, 2013    (JP) ................................. 2013-159402

(51) Int. Cl.
*H02K 41/03*   (2006.01)
*H02K 15/03*   (2006.01)

(52) U.S. Cl.
CPC ........... *H02K 41/031* (2013.01); *H02K 15/03* (2013.01)

(58) Field of Classification Search
CPC .... H02K 41/00–41/065; H02K 5/128–5/1285; H02K 33/00–33/18
USPC ..................................................... 310/86–88

IPC ....................................................... H02K 41/03
See application file for complete search history.

(56) References Cited

U.S. PATENT DOCUMENTS

| | | | |
|---|---|---|---|
| 2004/0066097 A1* | 4/2004 | Kobayashi ............. | H02K 33/16 310/13 |
| 2009/0033157 A1* | 2/2009 | Maemura ............... | H02K 41/03 310/12.22 |
| 2010/0052439 A1* | 3/2010 | Potter .................. | H02K 19/103 310/49.44 |

FOREIGN PATENT DOCUMENTS

| | | | | |
|---|---|---|---|---|
| CN | 101292414 A | 10/2008 | | |
| CN | WO 2010048756 A1 * | 5/2010 | ............. | F04B 47/06 |
| CN | 101873045 A | 10/2010 | | |
| CN | 102624191 A | 8/2012 | | |
| JP | 2000-058319 A | 2/2000 | | |

(Continued)

OTHER PUBLICATIONS

Machine Translation, Wang et al., WO 2010048756 A1, May 6, 2010.*

*Primary Examiner* — Thomas Truong
(74) *Attorney, Agent, or Firm* — Rudy J. Ng; Bret E. Field; Bozicevic, Field & Francis LLP

(57) ABSTRACT

Provided are an actuator capable of easily aligning the center axis of an entire apparatus including a mover and a stator, and a method of manufacturing the actuator. The actuator includes a mover unit which includes a mover having a magnetic field part attached to a peripheral surface of center part of a shaft, bearing parts provided on both end parts of the shaft, a cylindrical body which houses the center part of the shaft and the magnetic field part therein, and has both end parts connected to the bearing parts. A stator in which coils are wound on a core and case bodies are fixed to each other by screws, and then the mover unit is inserted into a fixed body of the stator and the case bodies from an opening side of the case body.

7 Claims, 18 Drawing Sheets

(56) References Cited

FOREIGN PATENT DOCUMENTS

| | | |
|---|---|---|
| JP | 2001-320864 A | 11/2001 |
| JP | 2007-221960 A | 8/2007 |
| JP | 2008-187824 A | 8/2008 |
| JP | 2010-288418 A | 12/2010 |
| JP | 2012-075235 A | 4/2012 |

\* cited by examiner

F I G. 5D
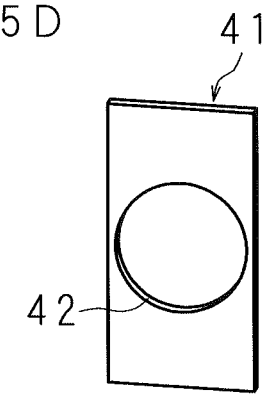
F I G. 5E
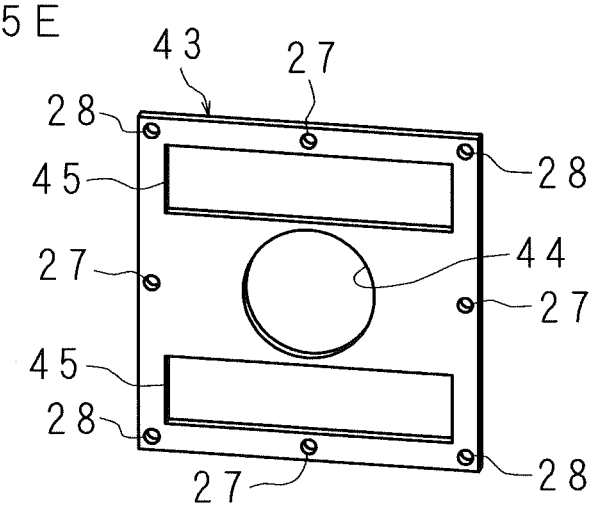

F I G. 6
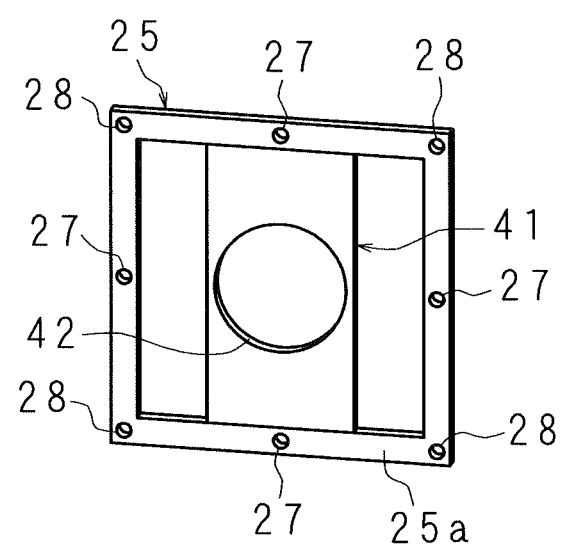

ACTUATOR AND METHOD OF MANUFACTURING ACTUATOR

CROSS-REFERENCE TO RELATED APPLICATIONS

This application is the national phase under 35 U.S.C. §371 of PCT International Application No. PCT/JP2013/081599 which has an International filing date of Nov. 25, 2013 and designated the United States of America.

FIELD

The present invention relates to an actuator in which a mover having a magnetic field part including permanent magnets and a stator formed of an armature are combined, and a method of manufacturing the actuator.

BACKGROUND

In a manufacturing apparatus for manufacturing machine tools, electric components, semiconductor products, or the like, an actuator is widely used as a driving source for linearly moving a table on which an object to be machined is placed. As a configuration of such an actuator, there is a technique known in the art, in which a mover formed in which a magnetic field part having a plurality of cylindrical permanent magnets is provided on a peripheral surface of a shaft body (shaft) is inserted in a stator formed of a hollow cylindrical armature in which coils are wound on a core (for example, Japanese Patent Application Laid-Open No. 2000-58319, Japanese Patent Application Laid-Open No. 2008-187824 and the like).

In addition, as a configuration of the stator, there is a technique known in the art, in which soft magnetic bodies having a magnetic pole part, a yoke part disposed outside of the magnetic pole part, and two core parts connecting the yoke part and the magnetic pole part are overlapped with each other by changing the direction thereof by 90 degrees, and then winding on the core units is performed (for example, Japanese Patent Application Laid-Open No. 2012-75235).

SUMMARY

FIG. 15 is a cross-sectional view illustrating a configuration of a conventional actuator formed by combining the mover and the stator having the configuration as described above. The actuator includes a mover 50 and a stator (armature) 60.

The mover 50 has a long columnar shaft 51 of a non-magnetic material whose center part has a larger diameter than both end parts thereof, a magnetic field part 52 adhered to a peripheral surface of the center part of the shaft 51, and nuts 53 and 53 for restraining fluctuation of the magnetic field part 52.

The magnetic field part 52 has a configuration in which a plurality of cylindrical permanent magnets 52a and a plurality of cylindrical yokes 52b are alternately adhered to the peripheral surface of the shaft 51 one by one in an axial direction of the shaft 51. In order to prevent the magnetic field part 52 from moving along the outer circumference of the shaft 51, both end faces thereof are locked by the nuts 53 and 53.

A hollow rectangular stator 60 has a core 61 formed by laminating a plurality of rectangular steel plates having an opening at a center part thereof, and coils 62 and 63 wound on upper and lower portions of the core 61 with the opening interposed therebetween. The mover 50 is inserted in the hollow portion of the stator 60, and both end parts of the mover 50 (shaft 51) are slidably held in case bodies 73 and 74, respectively, in the axial direction thereof through bearing members 71 and 72 such as bushes, flat springs, or the like. The bearing member 71 is fixed to the case body 73 by screws 75, and the bearing member 72 is fixed to the case body 74 by screws 76. In addition, the core 61 and the case bodies 73 and 74 are fixed to each other by screws 77.

When assembling the actuator having the above-described configuration, the mover 50 is inserted into the hollow portion of the stator 60, then the case bodies 73 and 74 are covered on the both end parts of the mover 50 (shaft 51) through the bearing members 71 and 72 to be held thereon, and the bearing members 71 and 72 are fixed to the case bodies 73 and 74 by the screws 75 and 76, as well as the stator 60 (core 61) and the case bodies 73 and 74 are fixed to each other by the screws 77.

In the actuator after assembling, in order to obtain a sufficient thrust force so as to achieve smooth movement of the mover 50, it is necessary to provide a uniform predetermined gap between an outer peripheral surface of the magnetic field part 52 and an inner peripheral surface of the core 61 over an entire area in the circumferential direction.

However, in the conventional actuator, it is difficult to set the uniform gap over the entire area in the circumferential direction. In other words, in the conventional actuator, since the mover 50, the stator 60, the bearing members 71 and 72, and the case bodies 73 and 74 are respectively prepared by different components, and these components are assembled in a lump, it is difficult to perform alignment of the respective center axes, and in particular, the alignment of the center axis of the mover 50 and the center axis of the stator 60 is difficult.

FIGS. 16A to 16C are cross-sectional views for describing the above-described problems. In FIGS. 16A to 16C, the members having the same configurations as FIG. 15 are denoted by the same reference numerals and, they will not be described. When inserting the mover 50 into the stator 60 (see FIG. 16A), since a magnetic absorption force acts between the permanent magnets 52a of the mover 50 and the core 61 of a magnetic material, the mover 50 is deviated, such that the gap between the outer peripheral surface of the magnetic field part 52 and the inner peripheral surface of the core 61 is not uniform across the circumferential direction. Sometimes, a situation in which a part of the outer peripheral surface of the magnetic field part 52 is stuck to the core 61 may also occur (see inside of broken line a in FIG. 16B). Further, in the state in which the gap between the outer peripheral surface of the magnetic field part 52 and the inner peripheral surface of the core 61 is different depending on the position (see inside of broken line b in FIG. 16C), when the mover 50 is held through the bearing members 71 and 72, the outer peripheral surface of the core 61 and the outer peripheral surface of the case bodies 73 and 74 are not the same level as each other (see inside of broken line c in FIG. 16C), and thereby a case in which fixation of the core 61 and the case bodies 73 and 74 by the screws 77 cannot be performed may also occur.

Furthermore, in the conventional actuator, due to the deviation of the mover 50 as described above, the permanent magnets 52a and/or the core 61 may be damaged, or since an unwanted force is applied to the bearing members 71 and 72, the bearing members 71 and 72 are rapidly worn. In addition, due to a deviation of the center axis between the mover 50 and the stator 60, it is difficult to stably obtain constant thrust force characteristics.

In consideration of the above-mentioned circumstances, it is an object of the present invention to provide an actuator capable of easily aligning the center axis of an entire apparatus including a mover and a stator, and a method of manufacturing the actuator.

Another object of the present invention is to provide an actuator capable of reliably and easily providing a uniform gap over the entire area in the circumferential direction between an outer peripheral surface of a mover and an inner peripheral surface of a stator, and a method of manufacturing the actuator.

Another object of the present invention is to provide an actuator capable of stably obtaining constant thrust force characteristics, since it is possible to accurately align the center axis of a mover with respect to a stator at all times, and a method of manufacturing the actuator.

According to one aspect of the present invention, there is provided an actuator which includes a stator in which coils are wound on a core having a tubular opening, and a mover inserted into the core, wherein the mover has a columnar shaft body and a plurality of permanent magnets provided on a peripheral surface side of the shaft body, and at least one end part of the shaft body is supported in a case body through a bearing part, the actuator including: a non-magnetic cylindrical body which houses a portion of the shaft body and the permanent magnets, wherein the cylindrical body and the bearing part are connected with each other.

In the actuator according to the present invention, the bearing part may have a bush.

In the actuator according to the present invention, the mover may have two shaft bodies.

In the actuator according to the present invention, the core may be formed by laminating a plurality of core element plates each of which is formed by overlapping a plurality of magnetic plates, and a restraining member of non-magnetic material may be provided between the adjacent core element plates to restrain the magnetic plates from being opened.

According to another aspect of the present invention, there is provided a method of manufacturing an actuator which includes a stator in which coils are wound on a core having a tubular opening, and a mover inserted into the core, wherein the mover has a columnar shaft body and a plurality of permanent magnets provided on a peripheral surface side of the shaft body, and at least one end part of the shaft body is supported in a case body through a bearing part, the method including: fixing the stator and the case body with each other; and inserting a mover unit having the mover, the bearing part, and a non-magnetic cylindrical body which houses a portion of the shaft body and the permanent magnets and is connected with the bearing part, into the opening of the core of the stator fixed to the case body.

The actuator of the present invention has a configuration in which the non-magnetic cylindrical body housing a part of the shaft body and the magnetic field part of the mover and the bearing part provided on both end parts or one end part of shaft body of the mover are connected with each other, and the mover and the bearing part are unitized as one configuration unit (mover unit). In addition, when manufacturing the actuator by assembling the mover unit, the stator and the case body, first, the stator (core) and the case body are fixed to each other, and then, the mover unit is inserted into the hollow tubular stator, such that the mover is slidably held by the case body through the bearing part.

In the conventional example, since the mover and the bearing part are formed as separate units from each other, alignment of the center axis of the mover with respect to the stator is difficult. However, in the present invention, since the mover and the bearing part are formed as one unit, the center axis of the mover is determined by the accuracy of the respective components, and thereby accurate alignment of the center axis of the mover with respect to the stator can be easily performed. In addition, a proper gap can be set between the stator and the mover over the entire area of the peripheral surface thereof.

In the present invention, since the cylindrical body is installed between the mover and the stator, a gap having a constant distance is reliably provided between the mover and the stator, such that when the mover unit is inserted into the stator, it is less likely to be affected by the absorption force. Therefore, also in this aspect, accurate alignment of the center axes therebetween can be easily performed. In addition, since the cylindrical body is installed between the mover and the stator, the mover and the stator are not directly rubbed during operation, and thereby a situation in which the permanent magnets and/or the core are damaged may not occur. Further, an excessive force does not act on the bearing part, thereby consumption of the bearing part can be suppressed.

According to the present invention, since the mover and the bearing part are unitized as one configuration unit, it is possible to easily perform the alignment of the mover and the stator with the shaft axis. In addition, when the mover unit is inserted into the stator, it is less likely to be affected by the absorption force, and thereby a deviation of the mover can be prevented. Accordingly, it is possible to stably maintain a suitable gap between the mover and the stator, and obtain a constant and sufficient thrust force at all times. Further, an unwanted force is not applied to the bearing part, thereby consumption of the bearing part can be reduced.

The above and further objects and features will more fully be apparent from the following detailed description with accompanying drawings.

BRIEF DESCRIPTION OF THE DRAWINGS

FIG. 5D is a perspective view illustrating a component member of the core of the stator (armature) in the actuator of the present invention.

FIG. 5E is a perspective view illustrating a component member of the core of the stator (armature) in the actuator of the present invention.

FIG. 6 is a perspective view illustrating a state in which a restraining plate is assembled into a core element plate in the actuator of the present invention.

DETAILED DESCRIPTION

Hereinafter, embodiments of the present invention will be described with reference to the accompanying drawings.

Figure 1:
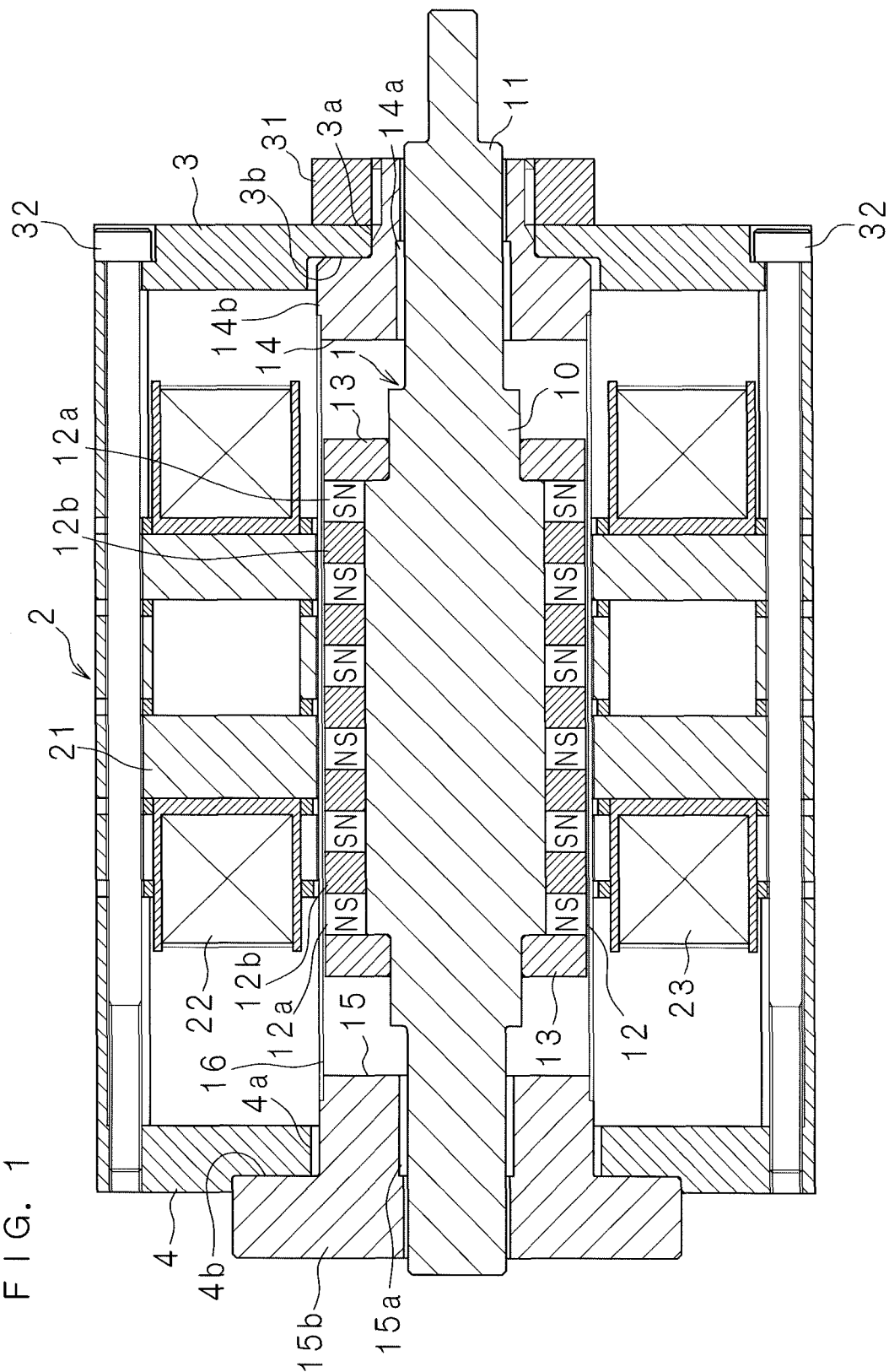
FIG. 1 is a cross-sectional view illustrating a configuration of an actuator according to the present invention.
Figure 2:
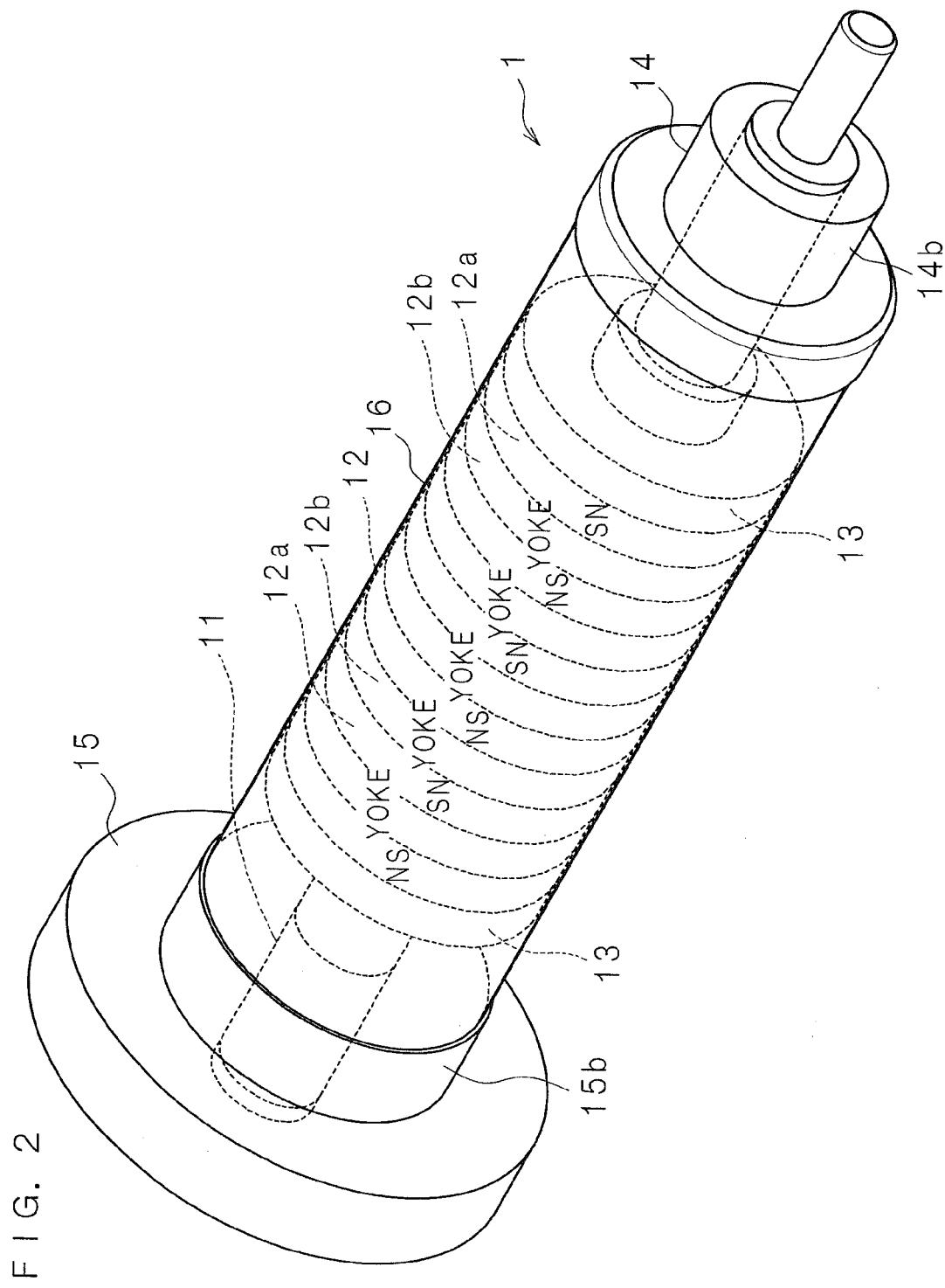
FIG. 2 is a perspective view illustrating a mover unit in the actuator of the present invention.
Figure 3:
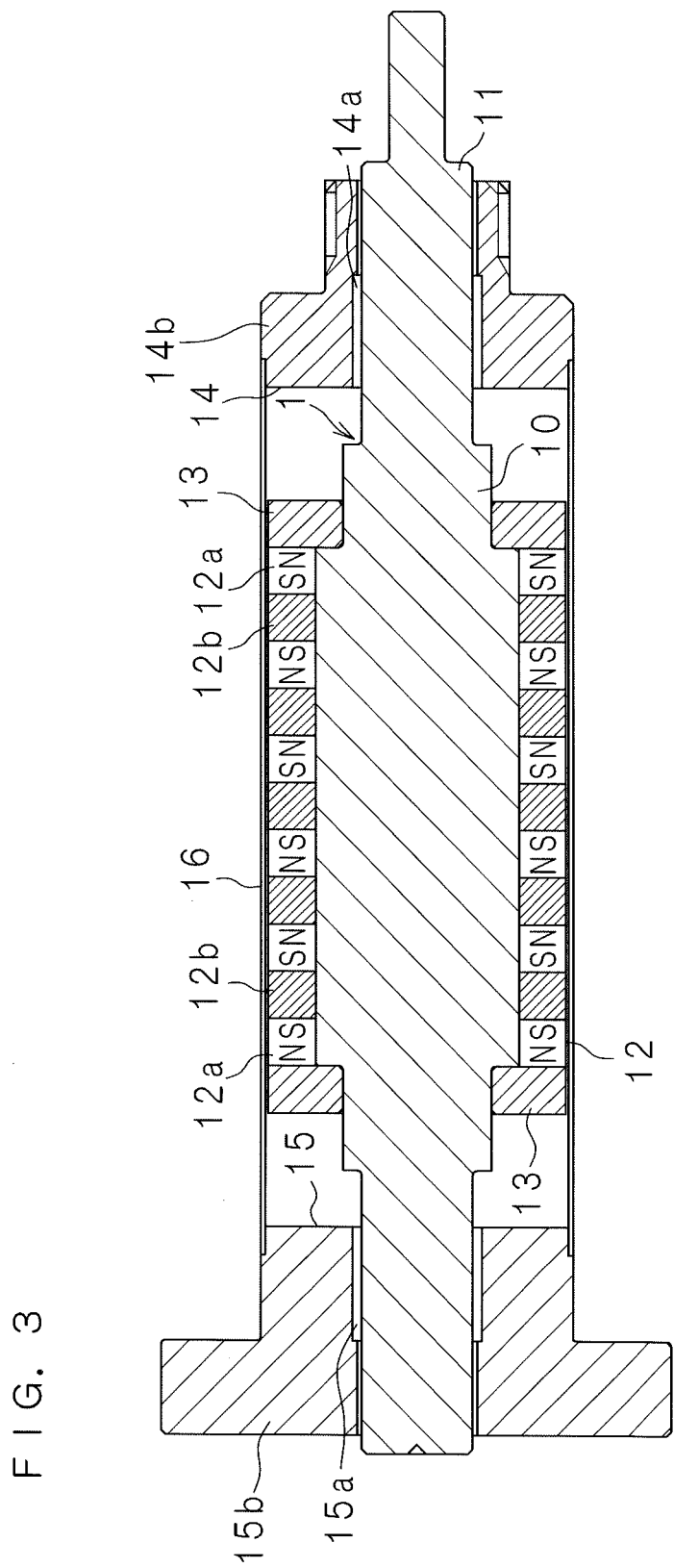
FIG. 3 is a cross-sectional view illustrating the mover unit in the actuator of the present invention.

FIG. 1 is a cross-sectional view illustrating a configuration of an actuator according to the present invention, and FIGS. 2 and 3 are a perspective view and cross-sectional view illustrating a mover unit in the actuator of the present invention.

The actuator of the present invention includes a mover unit 1 including a mover 10, a stator 2 formed of an armature, and case bodies 3 and 4. In addition, the mover unit 1 has bearing parts 14 and 15, and a cylindrical body 16 other than the mover 10.

The mover 10 has a shaft 11 made of a non-magnetic material as a long columnar shaft body, a magnetic field part 12 attached to a peripheral surface of the shaft 11, and nuts 13 and 13 for restraining fluctuation of the magnetic field part 12. The shaft 11 is made of, for example, non-magnetic stainless steel, and has a center part with a larger diameter than both end parts thereof, wherein the magnetic field part 12 is adhered to the peripheral surface of the center part thereof.

The magnetic field part 12 has a configuration in which a plurality of cylindrical permanent magnets 12a and a plurality of cylindrical yokes 12b are alternately adhered to the peripheral surface of the shaft 11 one by one in the axial direction of the shaft 11. These plurality of permanent magnets 12a are arranged in such a manner that, in two permanent magnets 12a adjacent to each other with one yoke 12b interposed therebetween, the magnetic poles of the same polarity are opposed to each other. In order to prevent the magnetic field part 12 from moving along the outer circumference of the shaft 11, both end faces thereof are locked by the nuts 13 and 13.

The bearing part 14 and the bearing part 15, which are made of a non-magnetic material, for example, non-magnetic stainless steel, are provided on both end parts of the shaft 11, such that the shaft 11 can slide in the axial direction.

The cylindrical bearing part 14 provided on one end part of the shaft 11 (hereinafter, simply referred to as one end part) has a bush 14a which functions as a bearing for the shaft 11, and a flange 14b into which the bush 14a is internally fitted. A shaft 11—one end part side (right side in FIG. 3) of the flange 14b has a smaller outer diameter than a shaft 11—center part side (left side in FIG. 3) thereof, and the bush 14a is disposed on the shaft 11—center part side of the flange 14b.

The cylindrical bearing part 15 provided on the other end part of the shaft 11 (hereinafter, simply referred to as the other end part) has a bush 15a which functions as a bearing for the shaft 11, and a flange 15b into which the bush 15a is internally fitted. A shaft 11—center part side (right side in FIG. 3) of the flange 15b has a smaller outer diameter than a shaft 11—the other end part side (left side in FIG. 3) thereof, and the shaft 11—center part side of the flange 15b has substantially the same outer diameter as the outer diameter of the shaft 11—center part side of the flange 14b. The bush 15a is disposed on the shaft 11—center part side of the flange 15b.

The cylindrical body 16 is made of a thin non-magnetic material, and houses the mover 10 (the center part of the shaft 11 and the magnetic field part 12) therein. The cylindrical body 16 is made of, for example, a non-magnetic material such as non-magnetic stainless steel, ceramic, etc., and is installed between an outer peripheral surface of the magnetic field part 12 and an inner peripheral surface of a core 21 of the stator 2 to be described below.

One end part of the cylindrical body 16 is connected to the flange 14b by welding, and the other end part of the cylindrical body 16 is connected to the flange 15b by welding. Furthermore, the cylindrical body 16 is connected by welding, but it is not limited thereto, and both end parts of the cylindrical body 16 may be connected to the flanges 14b and 15b by other methods such as tight fitting, shrink fitting or the like. Briefly, the connecting method may use any method known in the art.

Figure 4:
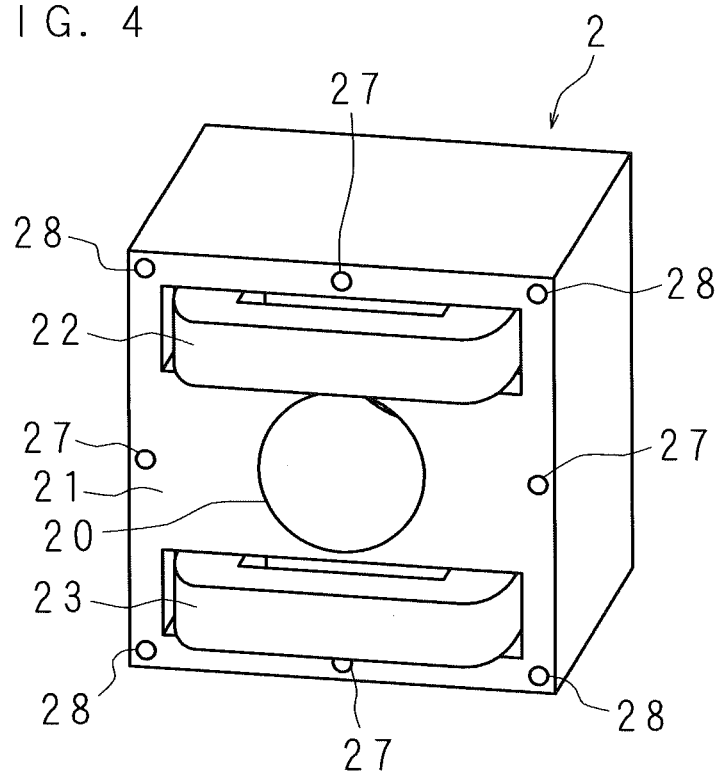
FIG. 4 is a perspective view illustrating a stator (armature) in the actuator of the present invention.

FIG. 4 is a perspective view illustrating the stator (armature) 2 in the actuator of the present invention, and FIGS. 5A to 5E are perspective views illustrating the component members of the core of the stator (armature) 2 in the actuator of the present invention. The stator 2 has a hollow outer rectangular shaped core 21 of a magnetic material having an opening 20 in the center part thereof, and coils 22 and 23 wound on upper and lower portions of the core 21 with the opening 20 interposed therebetween.

Figure 5A:
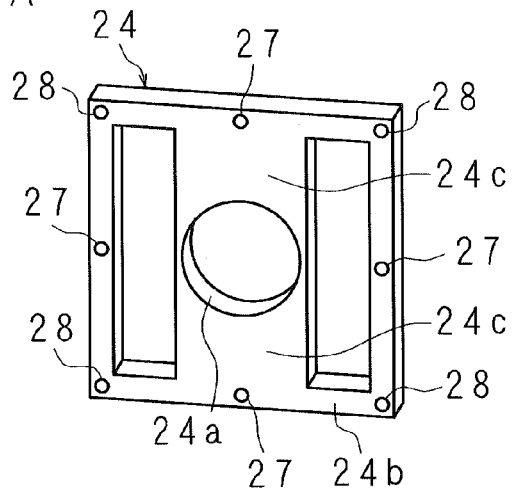
FIG. 5A is a perspective view illustrating a component member of a core of the stator (armature) in the actuator of the present invention.
Figure 5B:
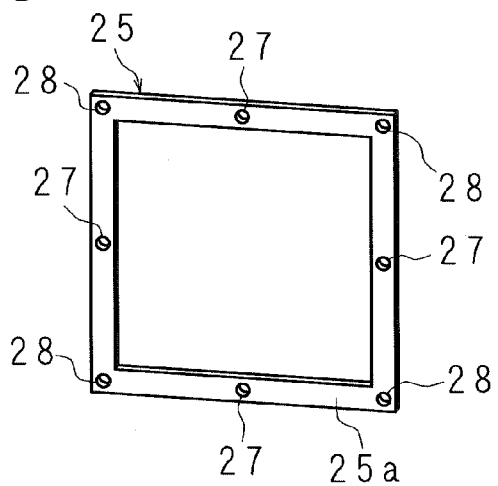
FIG. 5B is a perspective view illustrating a component member of the core of the stator (armature) in the actuator of the present invention.
Figure 5C:
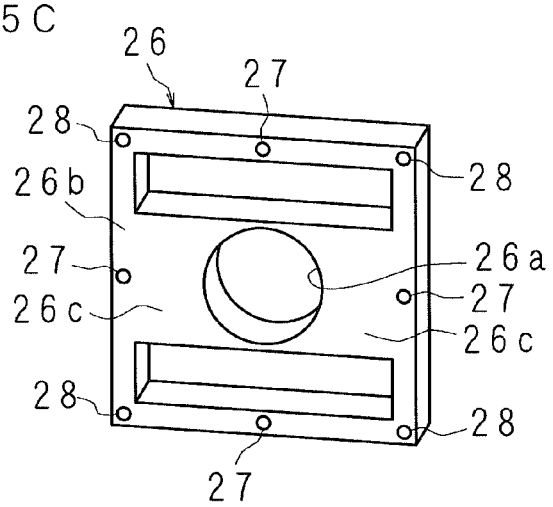
FIG. 5C is a perspective view illustrating a component member of the core of the stator (armature) in the actuator of the present invention.

The core 21 is formed by laminating core element plates as illustrated in FIGS. 5A to 5C in which a plurality of magnetic materials are overlapped, a restraining plate as illustrated in FIG. 5D, and a frame plate as illustrated in FIG. 5E. A core element plate 24 illustrated in FIG. 5A is formed by overlapping a plurality of silicon steel plates having the same shape as each other, and has a magnetic pole part 24a into which the mover 10 is inserted, a yoke part 24b disposed on an outside of the magnetic pole part 24a, and connection parts 24c and 24c which connect the magnetic pole part 24a and the yoke part 24b. A core element plate 25 illustrated in FIG. 5B is formed by overlapping a plurality of silicon steel plates having the same shape as each other, and has only a yoke part 25a. A core element plate 26 illustrated in FIG. 5C is formed by overlapping a plurality of silicon steel plates having the same shape as each other in a shape of rotating the core element plate 24 by 90 degrees, and has a magnetic pole part 26a, a yoke part 26b, and connection parts 26c and 26c. In addition, each core element plate 24, 25 or 26 has screw holes 27 formed at a center of four side edge parts thereof, and pin holes 28 formed at four corners thereof.

A restraining plate 41 as a restraining member illustrated in FIG. 5D is made of a non-magnetic material, for example, plastic, and is formed in a rectangular shape. The restraining plate 41 has a length equal to that of an opening portion (inside dimension) of the core element plate 25, and the restraining plate 41 has a width about half of that of the opening portion (inside dimension) of the core element plate 25, and the restraining plate 41 has a thickness equal to that of the core element plate 25. In addition, an opening 42 into which the mover 10 is inserted is formed in a center of the restraining plate 41 in the longitudinal direction thereof. The restraining plate 41 is used with being assembled in the opening portion of the core element plate 25, as illustrated in FIG. 6. In this case, since the core element plate 25 has a thickness equal to that of the restraining plate 41, the core element plate 25 and the restraining plate 41 are in the same level as each other.

A frame body 43 illustrated in FIG. 5E is made of a non-magnetic material, for example, stainless steel or aluminum, and is formed in the same shape as the core element plate 26. That is, the frame body 43 has a configuration in which an opening 44 into which the mover 10 is inserted is formed in the center thereof, gaps 45 and 45 through which the coils 22 and 23 pass are formed at two places with the opening 44 interposed therebetween, the screw holes 27 are formed at four side edge parts thereof, and the pin holes 28 are formed at four corners thereof.

Figure 7:
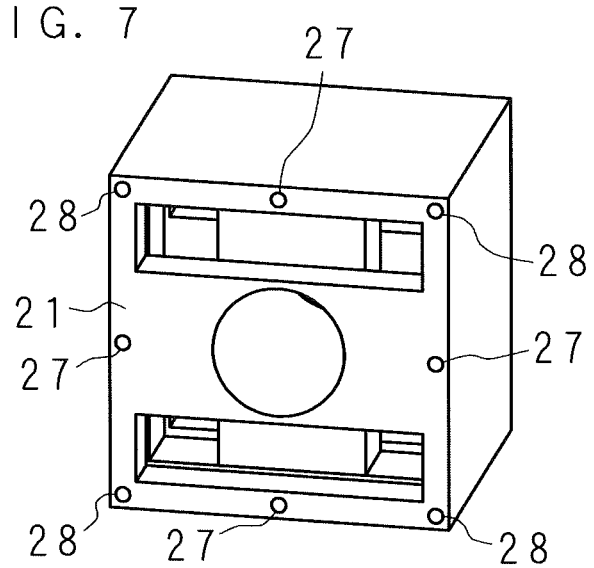
FIG. 7 is a perspective view illustrating the configuration of the core of the stator (armature) in the actuator of the present invention.

The core element plate 24, the core element plate 25 in which the restraining plate 41 is assembled (see FIG. 6), the core element plate 26, the core element plate 25 in which the restraining plate 41 is assembled, the core element plate 24, the core element plate 25 in which the restraining plate 41 is assembled, and the core element plate 26 are overlapped in this order to prepare a laminated body, and the frame bodies 43 are respectively overlapped on both ends of the laminated body. Then, pins are inserted and fixed into the pin holes 28 of the overlapped core element plates 24, 25, 26 and frame body 43, to thus form the hollow outer rectangular shaped core 21 as illustrated in FIG. 7. Thereafter, the coil 22 is wound on one connection part 24c of each core element plate 24 in a group, and the coil 23 is wound on the other connection part 24c of each core element plate 24 in a group, to manufacture the stator (armature) 2 as illustrated in FIG. 4.

Herein, since the core element plates 24 and 26 are respectively formed by overlapping the plurality of silicon steel plates, when inserting the mover 10, each silicon steel plate is magnetized to become such as magnets having the same polarity as each other, and since these plates face each other in the same polarity, each silicon steel plate may be opened and extended in the overlapped direction thereof by a magnetic repulsive force generated therebetween. Also, sometimes, since the silicon steel plates are bent, overlapping itself may be released. In such a case, magnetic flux is not concentrated in the core 21, such that stable actuator thrust force characteristics are no longer obtained.

However, in the present invention, since the restraining plate 41 is provided between adjacent core element plates 24 and 26, even when a magnetic repulsive force acts between the silicon steel plates, the motion of the silicon steel plates is restrained by the restraining plate 41 present therebetween, and thus opening and extending of each silicon steel plate in the overlapping direction can be suppressed. Thereby, magnetic flux is reliably concentrated in the core 21, such that it is possible to provide an actuator having stable thrust force characteristics.

Furthermore, the shape of the restraining plate 41 illustrated in FIG. 5D is an example, and it may have any shape so long as the mover unit 1 can be inserted and restrain the silicon steel plate from being opened.

The case body 3 on shaft 11—one end part side (right side in FIG. 1) has an opening 3a in the center thereof. The opening 3a has different diameters on the shaft 11—one end part side (right side in FIG. 1) and on the shaft 11—center part side (left side in FIG. 1) from a middle thereof, and specifically, the shaft 11—one end part side thereof has a smaller diameter than that of the shaft 11—center part side, and a stepped part 3b is formed at the middle. The opening 3a on the shaft 11—one end part side has a diameter substantially equal to the outer diameter of the flange 14b on the shaft 11—one end part side, and the opening 3a on the shaft 11—center part side has a larger diameter than the outer diameter of the flange 14b on the shaft 11—center part side. With the shaft 11—center part side of the flange 14b abutting the stepped part 3b, a portion of a tip part of the mover unit 1 protrudes outward from the opening 3a of the case body 3. The case body 3 and the bearing part 14 are fixed to each other by a ring member 31.

The case body 4 on the shaft 11—the other end part side (left side in FIG. 1) has an opening 4a in the center thereof. The opening 4a has different diameters on the shaft 11—center part side (right side in FIG. 1) and on the shaft 11—the other end part side (left side in FIG. 1), and specifically, the shaft 11—center part side thereof has a smaller diameter than that of the shaft 11—the other end part side, and a stepped part 4b is formed at the middle. The opening 4a on the shaft 11—center part side has a larger diameter than the outer diameter of the flange 15b on the shaft 11—center part side, and the opening 4a on the shaft 11—the other end part side has a diameter substantially equal to the outer diameter of the flange 15b on the shaft 11—the other end part side. The shaft 11—the other end part side of the flange 15b abuts the stepped part 4b.

As described above, with the flange 14b and the flange 15b abutting the case body 3 and the case body 4, respectively, the mover unit 1 is held by the case bodies 3 and 4. In addition, the case body 3, the stator 2 (core 21) and the case body 4 are integrally fixed by four screws 32 inserted into the screw holes 27 of the core 21.

In the actuator of the present invention, when switching plus (+) and minus (−) of current by flowing the current in a forward direction to the coils 22 and 23 then flowing the current in a reverse direction, the mover 10 inserted in the stator 2 linearly reciprocates in a lateral direction in FIG. 1 with respect to the stator 2.

Hereinafter, a method of assembling the actuator having the above-described configuration, in other words, manufacturing the actuator will be described.

First, the case body 3, the stator 2 (core 21) and the case body 4 are integrally fixed by the four screws 32 inserted in the screw holes 27 of the core 21. By this fixing, the center axis of the stator 2 is fixed.

Then, the mover unit 1 having the above-described configuration as illustrated in FIGS. 2 and 3 is inserted into the opening 4a of the case body 4 from one end part side thereof, and is moved forward in a tip direction (right direction in FIG. 1). The mover unit 1 is moved forward until a base end part of the flange 14b on one end part side of the mover unit 1 abuts the stepped part 3b of the case body 3. At this time, a base end part of the flange 15b on the other end part side of the mover unit 1 abuts the stepped part 4b of the case body 4. Since the stepped parts 3b and 4b are provided, positioning of the mover unit 1 can be easily performed. Finally, the case body 3 and the flange 14b (bearing part 14) are fixed to each other by the ring member 31.

By the above described process, the actuator as illustrated in FIG. 1 is assembled. In the assembled actuator, the magnetic field part 12 of the mover 10 is inserted in the stator 2 (core 21) having the tubular opening, and the cylindrical body 16 is installed between the outer peripheral surface (magnetic pole part) of the magnetic field part 12 of the mover 10 and the inner peripheral surface (magnetic pole part) of the core 21 of the stator 2, to thus form a gap having a proper distance therebetween. Thereby, a stable thrust force can be obtained during moving the mover 10.

Figure 15:
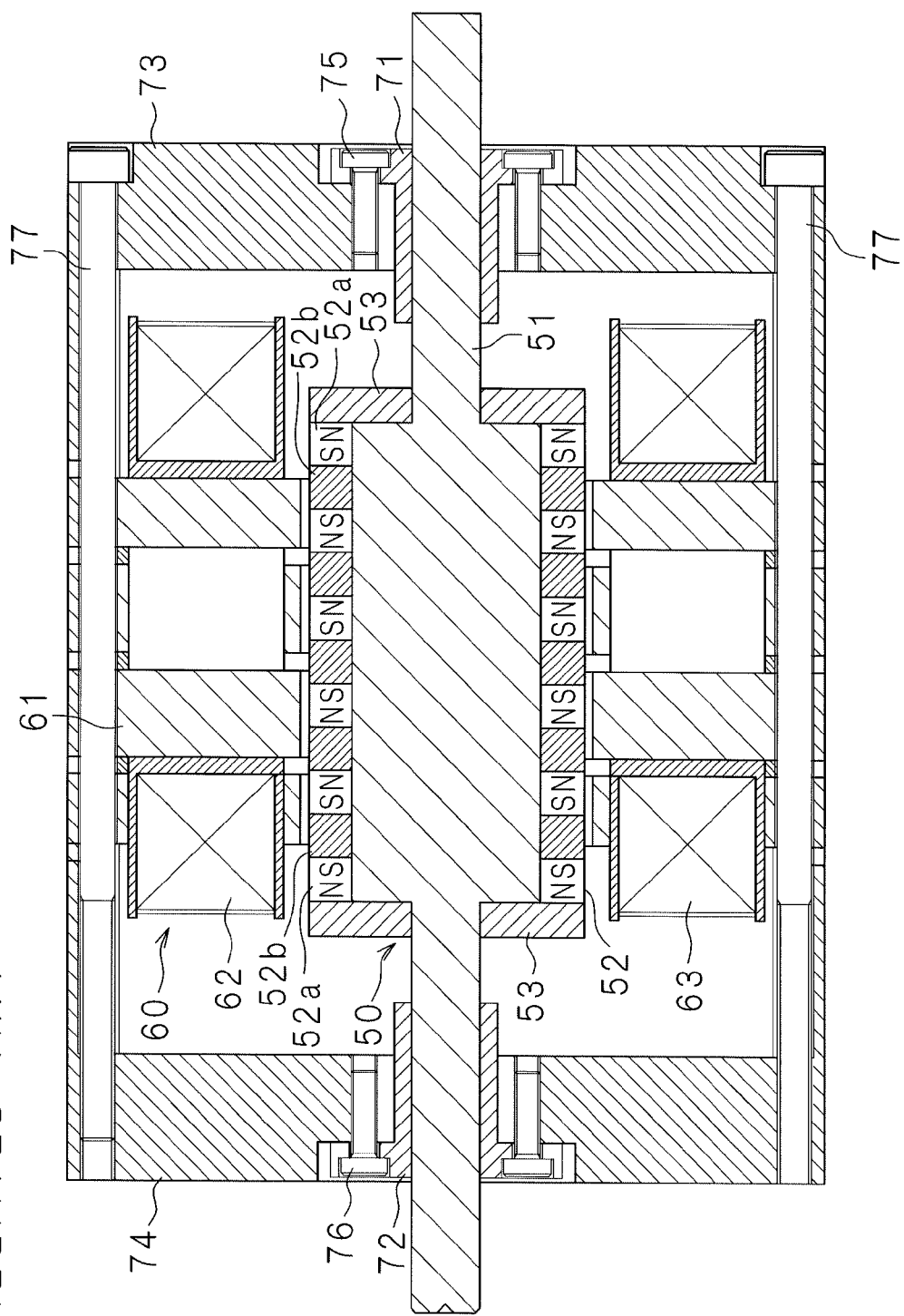
FIG. 15 is a cross-sectional view illustrating a configuration of a conventional actuator.
Figure 16A:
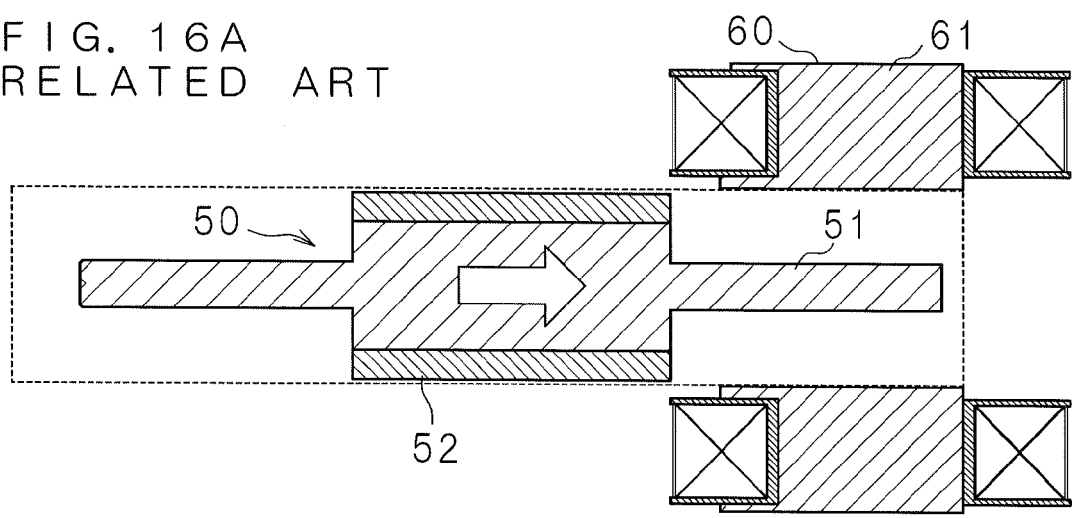
FIG. 16A is a cross-sectional view for describing problems entailed in the conventional actuator.
Figure 16B:
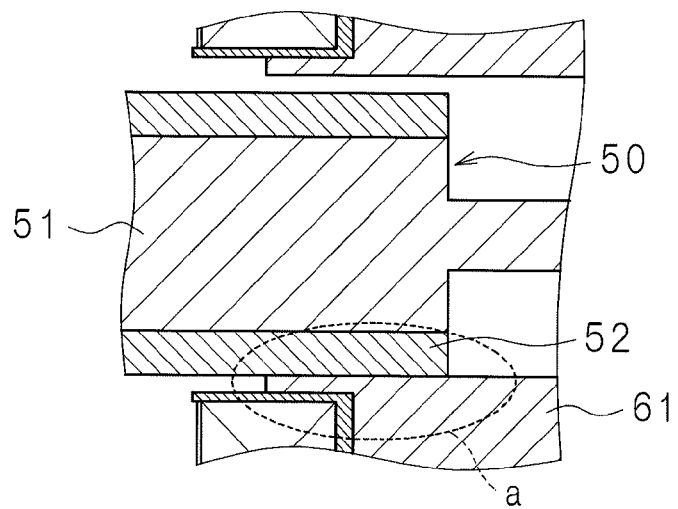
FIG. 16B is a cross-sectional view for describing problems entailed in the conventional actuator.
Figure 16C:
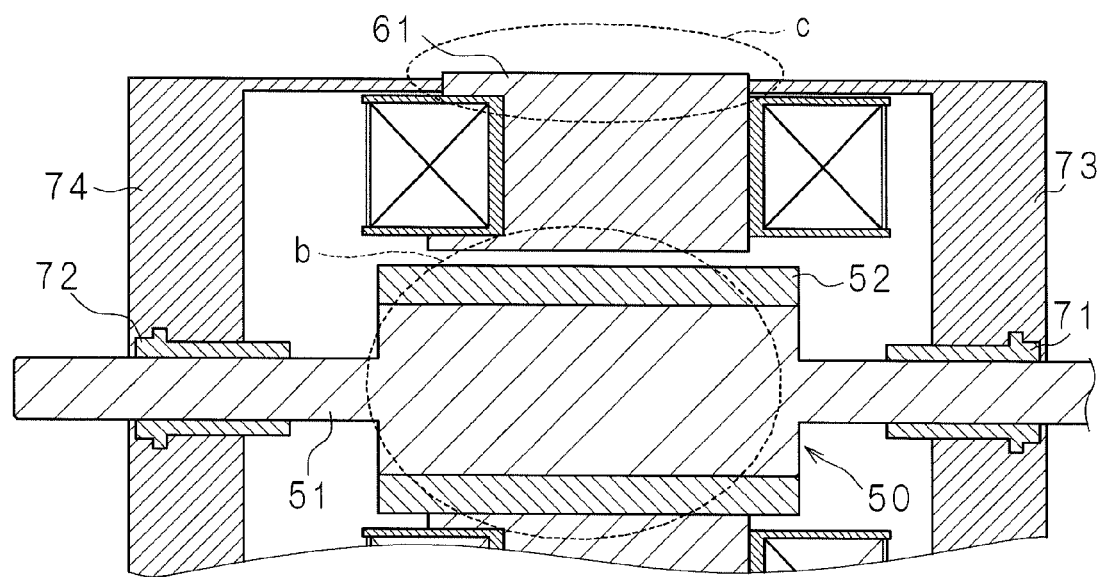
FIG. 16C is a cross-sectional view for describing problems entailed in the conventional actuator.

In the conventional example as illustrated in FIG. 15, since the mover and the bearing part are formed as separate units from each other, for the center axis of the mover, the center axis of the bearing part, the center axis of the stator, and the center axis of the case body, finally the center axes thereof should be respectively aligned in a lump, and at this time, due to the influence of absorption force applied thereto, a process of performing the alignment of the center axis of the mover with respect to the stator is difficult, and a displacement in center axes between the mover and the stator is unavoidable.

On the other hand, in the present invention, by using the mover unit 1 in which the mover 10 and the bearing parts 14 and 15 are unitized as one configuration unit, it is possible to previously perform the alignment of the mover 10 and the bearing parts 14 and 15 with the shaft axis in an environment with no influence by the absorption force. In addition, after the stator 2 and the case bodies 3 and 4 are fixed to each other, briefly, after alignment of the center axis of the stator 2 and the center axes of the case bodies 3 and 4 is completed, the mover unit 1 is inserted therein. Further, since the non-magnetic cylindrical body 16 is installed between the mover 10 and the stator 2, when the mover unit 1 is inserted into the stator 2, it is less likely to be affected by the absorption force.

Therefore, the process of aligning the center axis of the mover 10 with respect to the stator 2 during inserting the mover unit 1 can be significantly easily performed with high aligning accuracy of the center axis thereof. In addition, it is possible to provide a uniform predetermined gap over the entire area in the circumferential direction between the outer peripheral surface of the magnetic field part 12 and the inner peripheral surface of the core 21, and obtain a sufficient thrust force so as to achieve smooth movement of the mover 10.

Further, since deviation of the mover 10 to the stator 2 does not occur, the magnetic field part 12 is not rubbed against the core 21, as well as, even if the deviation does occur in the mover 10, the mover 10 and the stator 2 are not directly rubbed during operation since the cylindrical body 16 is installed therebetween, and thereby the permanent magnets 12a and/or the core 21 cannot be damaged. Further, since an excessive force is not applied to the bearing parts 14 and 15, consumption of the bearing parts 14 and 15 including the bushes 14a and 15a is suppressed.

For the example of the present invention and the conventional example, by assembling the actuator, thrust force characteristics were measured. Hereinafter, results thereof will be described.

In the conventional example, as described above, since the mover and the bearing part are formed as separate units from each other, for the center axes of the mover, the bearing part, the stator and the case body should be aligned in a lump, it is difficult to align these components, and until the assembly is completed, it is necessary for two or more workers to work for substantially one day. On the other hand, in the example of the present invention, since the mover and the bearing part are unitized as one configuration unit, it is possible to complete the assembly within one minute by one worker. Thereby, it can be seen that workability in the example of the present invention can be greatly improved compared to the conventional example. Furthermore, in the example of the present invention, inserting and withdrawing the mover unit can be simply performed, and replacing the bush can also be easily performed.

Figure 8:
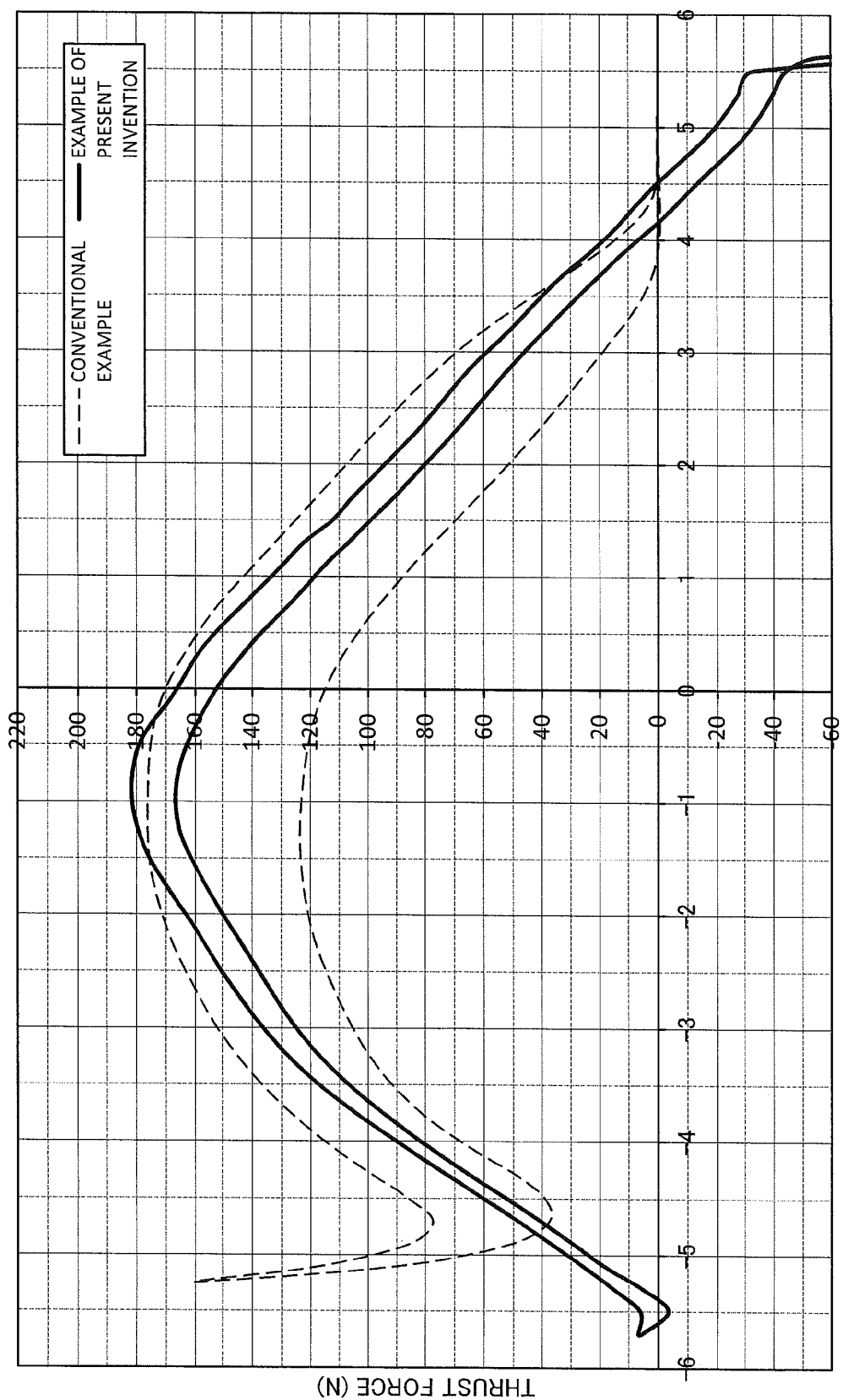
FIG. 8 is a graph representing the measured results of thrust force in one reciprocation of an example of the present invention and a conventional example.

For the actuators assembled in the example of the present invention and the conventional example, by reciprocating the mover with respect to the stator by only once, respectively, thrust force of that action was measured. Measuring was performed using the method as described below. First, the stator was fixed to a stage. The mover was jointed with a load cell. After the mover was inserted into the stator, and a rated current (1.8 A) was applied thereto, the mover was moved with respect to the stator on the stage, stroke and thrust force waveform were measured. The measured results thereof are shown in FIG. 8. During moving forward and back, + and − of current were switched.

FIG. 8 shows a change in thrust force during one reciprocating movement by depicting the stroke (mm) in a horizontal axis and the thrust force (N) in the vertical axis, wherein broken lines illustrate the characteristics of the conventional example, and the solid lines illustrate the characteristics of the example of the present invention, respectively. In the conventional example, a thrust force difference of about 50 N occurs in one reciprocating movement forward and back of the mover. Meanwhile, in the example of the present invention, a thrust force difference of only about 15 N occurs in one reciprocating movement forward and back of the mover. The reason is that, in the present invention, the entire center axes including the mover and the stator can be aligned, and a suitable gap is formed between the outer peripheral surface of the magnetic field part 12 and the inner peripheral surface of the core 21 by installing the cylindrical body 16 therebetween. It can be seen that it is possible to greatly improve the thrust force characteristics in the example of the present invention.

Hereinafter, another embodiments of the mover unit 1 of the present invention will be described.

Another Embodiment A

Figure 9:
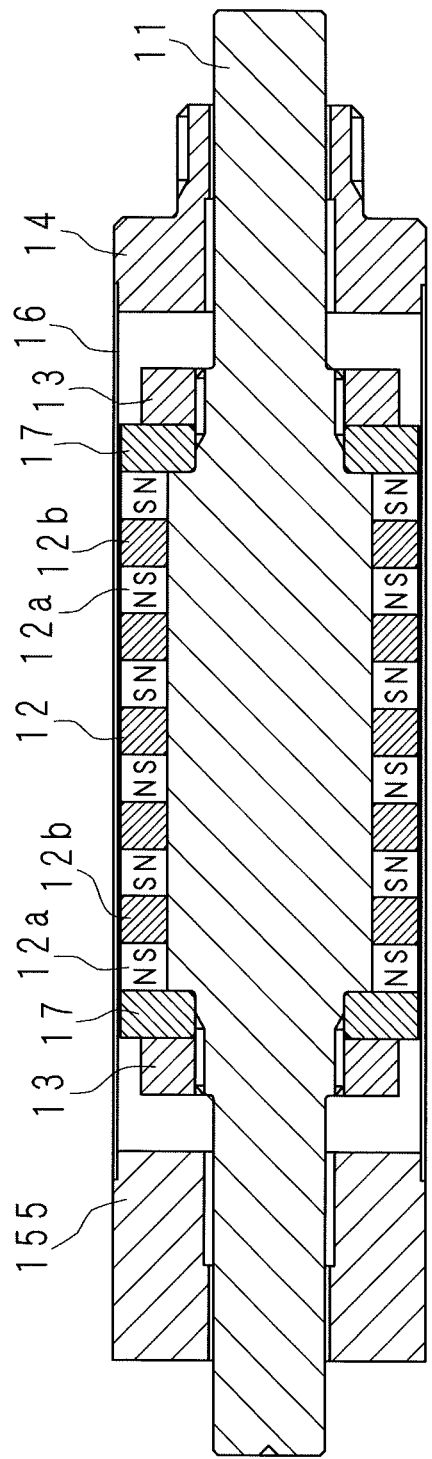
FIG. 9 is a cross-sectional view illustrating a mover unit in another Embodiment A of the present invention.

FIG. 9 is a cross-sectional view illustrating a mover unit in another Embodiment A. In FIG. 9, the similar to or same parts as those in FIG. 3 will be denoted by the same reference numerals.

Figure 10:
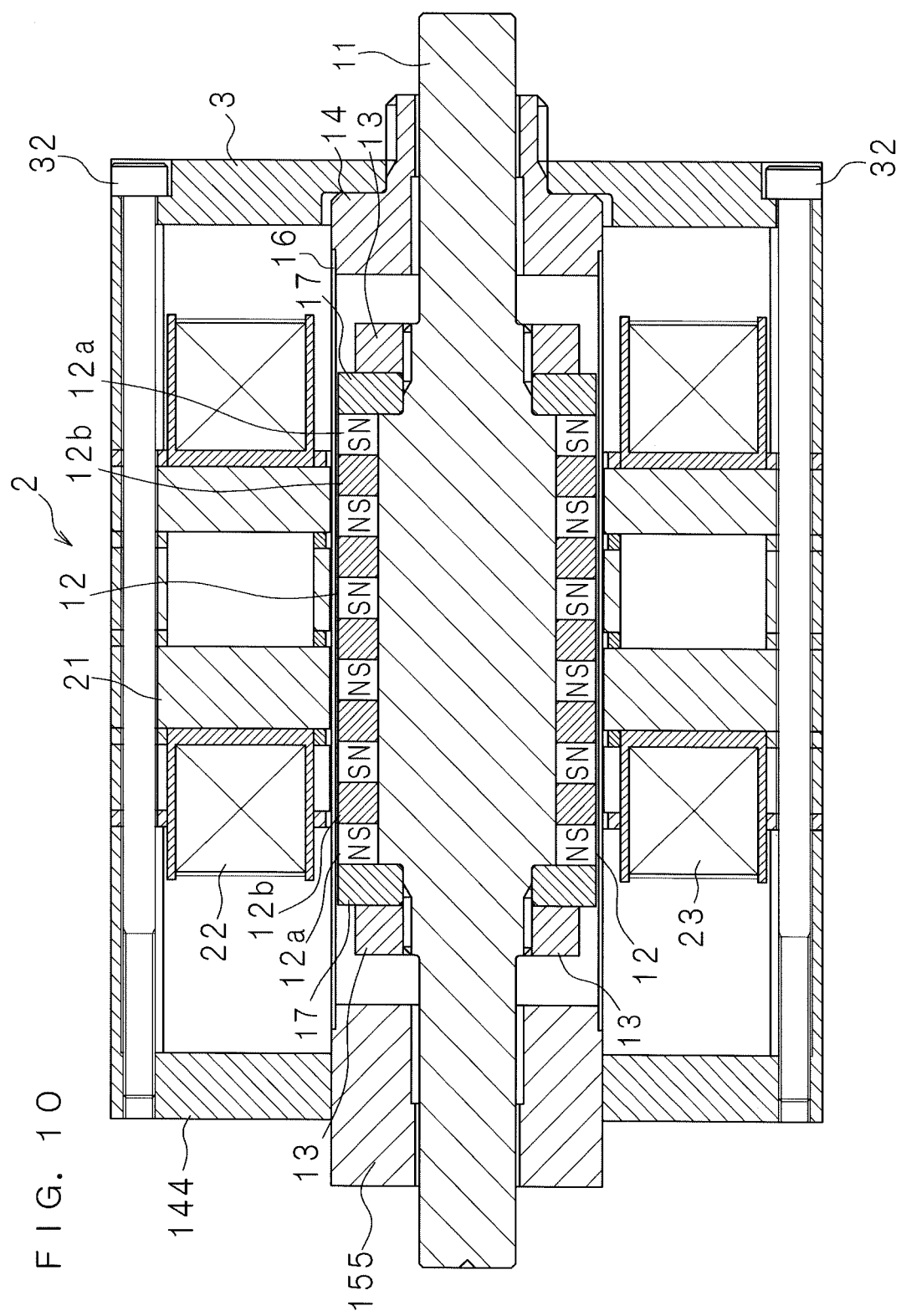
FIG. 10 is a cross-sectional view illustrating a configuration of actuator using the mover unit in another Embodiment A of the present invention.

In order to prevent a magnetic field part 12 including permanent magnets 12a and yokes 12b from moving along the outer circumference of the shaft 11, both end faces of the magnetic field part 12 are locked by locking members 17 and 17 made of a non-magnetic material, for example, aluminum, in addition to the nuts 13 and 13. The configuration of the bearing part 14 on the shaft 11—one end part side is similar to FIG. 3, but a bearing part 155 on the shaft 11—the other end part side is different from the bearing part 15 of FIG. 3. The bearing part 155 has a uniform outer diameter over the entire length thereof. Furthermore, other configuration is similar to the above-described embodiment. FIG. 10 is a cross-sectional view illustrating a configuration of actuator using the mover unit in this another Embodiment A. In FIG. 10, the similar to or same parts as those in FIG. 1 will be denoted by the same reference numerals. The configuration of the case body 3 on the shaft 11—one end part side is similar to FIG. 1, but a case body 144 on the shaft 11—the other end part side is different from the case body 4 of FIG. 1. A central opening of the case body 144 has a diameter which is uniform over the entire length thereof and is substantially equal to the outer diameter of the bearing part 155. The shaft 11 is supported by the case bodies 3 and 144 through the bearing parts 14 and 155.

Another Embodiment B

Figure 11:
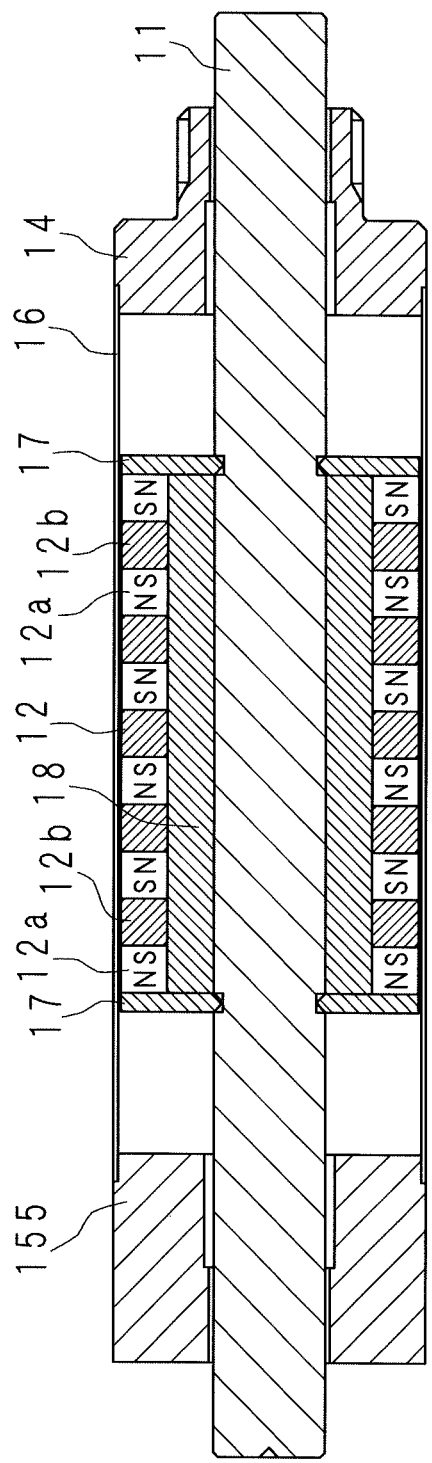
FIG. 11 is a cross-sectional view illustrating a mover unit in another Embodiment B of the present invention.

FIG. 11 is a cross-sectional view illustrating a mover unit in another Embodiment B. In FIG. 11, the similar to or same parts as those in FIG. 3 will be denoted by the same reference numerals.

In Embodiment B illustrated in FIG. 11, a columnar shaft 11 has a uniform diameter over the entire area in the axial direction. The shaft 11 on which a magnetic field part 12 including permanent magnets 12a and yokes 12b is provided at an interval of a gap, and a cylindrical member 18 made of a non-magnetic material, for example, aluminum is provided by adhering in the center part thereof for filling the gap. The magnetic field part 12 is adhered to the outer peripheral surface of the cylindrical member 18. In addition, in order to prevent the magnetic field part 12 from moving along the outer circumference of the shaft 11, both end faces of the magnetic field part 12 and the cylindrical member 18 are locked by locking members 17 and 17 made of a non-magnetic material, for example, aluminum. Further, grooves are formed in the shaft 11 at places corresponding to the locking members 17 and 17, and by caulking the portions of the grooves, the shaft 11, the magnetic field part 12, the locking members 17 and the cylindrical member 18 are integrally fixed to each other. Furthermore, the configuration of the bearing part 14 and the cylindrical body 16 is similar to the above-described embodiments. In addition, the configuration of the bearing part 155 is the same as Embodiment A.

In order to provide excellent thrust force characteristics in the mover 10 by smoothly moving the same, it is important to form a portion of the shaft 11 facing the bearing part in a smooth plane with a high-precision roundness as much as possible. Thereby, in the processing for the portion of the shaft 11, it is necessary to reduce the tolerances. In the processing of a line process centering on the center axis with respect to the columnar body, a portion having the largest outer diameter becomes a reference of the processing. Therefore, in the embodiment as illustrated in FIG. 3, since the shaft 11 has the largest outer diameter at the center part thereof, portions facing the bearing parts 14 and 15 which require high-precision processing do not become the reference of the processing, and it is not suitable for the processing during the line process. Thereby, there is a problem of not adequate to the mass production.

Whereas, in Embodiment B illustrated in FIG. 11, since the shaft 11 has a uniform diameter over the entire length thereof, in the processing during the line process, it is possible to set the portions of the shaft 11 facing the bearing parts 14 and 155 as the reference of the processing. Thereby, even if the line process is used, it is possible to accurately process the portions of the shaft 11 facing the bearing parts 14 and 155 to allow the mass production.

Another Embodiment C

Figure 12:
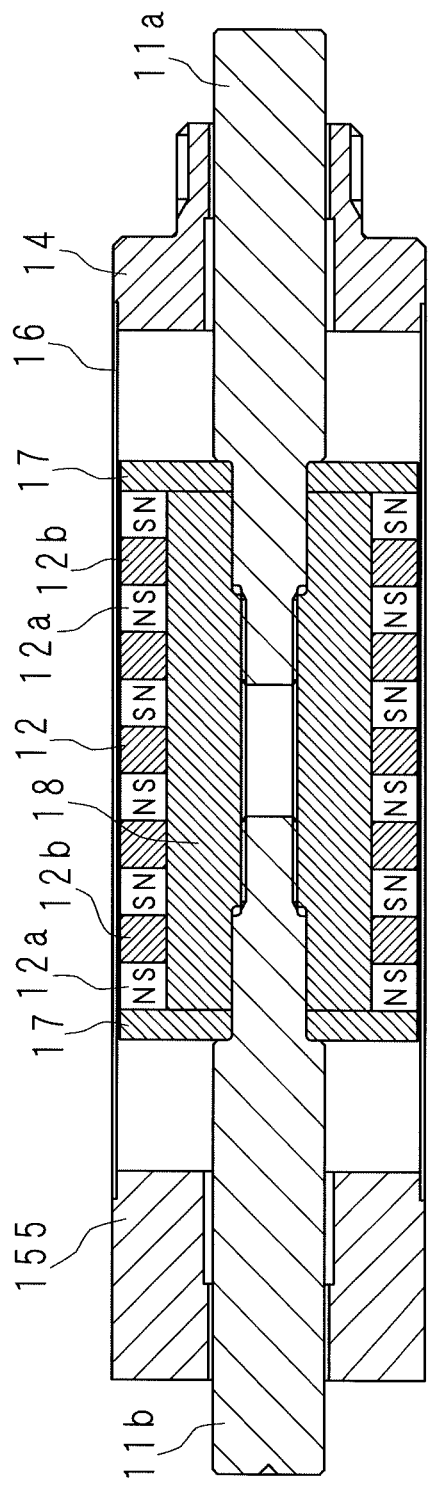
FIG. 12 is a cross-sectional view illustrating a mover unit in another Embodiment C of the present invention.

FIG. 12 is a cross-sectional view illustrating a mover unit in another Embodiment C. In FIG. 12, the similar to or same parts as those in FIG. 3 will be denoted by the same reference numerals.

In the Embodiment C, a mover unit 1 has two columnar shafts 11a and 11b. The shafts 11a and 11b are formed in the same shape as each other, and have one end parts formed in a smaller diameter than the other end parts, respectively. In the state in which the end parts having the smaller diameter face apart from each other at a suitable distance, the two shafts 11a and 11b are disposed with the same axial center as each other. In addition, threads are formed on peripheral surfaces of the end parts having the smaller diameter of the shafts 11a and 11b. A cylindrical member 18, which is made of a non-magnetic material, for example, aluminum, and has the magnetic field part 12 including the permanent magnets 12a and the yokes 12b adhered thereon, is provided in the center part of the mover unit 1 in the axial direction thereof. A thread is formed on the inner peripheral surface of the cylindrical member 18. In addition, the threads of the shafts 11a and 11b and the thread of the cylindrical member 18 are screwed with each other. Further, as similar to Embodiment B, both end faces of the magnetic field part 12 and the cylindrical member 18 are locked by the locking members 17 and 17. Furthermore, the configuration of the bearing part 14 and the cylindrical body 16 is similar to the above-described embodiments. In addition, the configuration of the bearing part 155 is the same as the Embodiment A.

In Embodiment C illustrated in FIG. 12, since the shafts 11a and 11b have the largest diameter at the portions thereof facing the bearing parts 14 and 155, in the processing during the line process, it is possible to set the portions of the shafts 11a and 11b facing the bearing parts 14 and 155 as the reference of the processing. Thereby, even if the line process is used, it is possible to accurately process the portion of the shafts 11a and 11b facing the bearing parts 14 and 155 to thus allow mass production. Furthermore, the two shafts 11a and 11b having the same shape as each other may not necessarily required, but by forming in the same shape as each other, it is possible to increase manufacturing yield and reduce the costs.

Another Embodiment D

Figure 13:
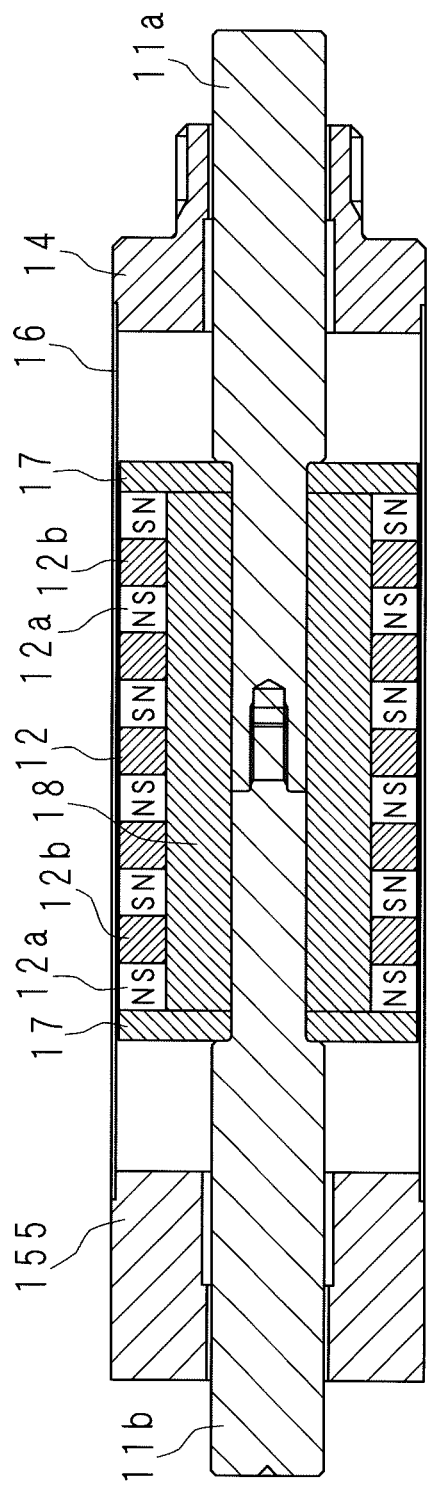
FIG. 13 is a cross-sectional view illustrating a mover unit in another Embodiment D of the present invention.

FIG. 13 is a cross-sectional view illustrating a mover unit in another Embodiment D. In FIG. 13, the similar to or same parts as those in FIG. 3 will be denoted by the same reference numerals.

In the Embodiment D, a mover unit 1 has two columnar shafts 11a and 11b. The shafts 11a and 11b have one end parts formed in a smaller diameter than the other end parts, respectively. A female thread is formed on the end part of the shaft 11a having the smaller diameter, and a male thread is formed on the end part of the shaft 11b having the smaller diameter. By screwing the female thread of the shaft 11a and the male thread of the shaft 11b with each other, the two shafts 11a and 11b are disposed in the same center axis as each other. In addition, a cylindrical member 18, which is made of a non-magnetic material, for example, aluminum, and has the magnetic field part 12 including the permanent magnets 12a and the yokes 12b adhered thereon, is provided in the center part of the mover unit 1 in the axial direction thereof. Further, similar to Embodiments B and C, both end faces of the magnetic field part 12 and the cylindrical member 18 are locked by the locking members 17 and 17. Furthermore, the configuration of the bearing part 14 and the cylindrical body 16 is similar to the above-described embodiments. In addition, the configuration of the bearing part 155 is the same as the Embodiment A.

In Embodiment D illustrated in FIG. 13, since the shafts 11a and 11b have the largest diameter at the portions thereof facing the bearing parts 14 and 155, even in the processing during the line process, it is possible to accurately process the portions of the shafts 11a and 11b facing the bearing parts 14 and 155, and to thus allow mass production.

Another Embodiment E

Figure 14:
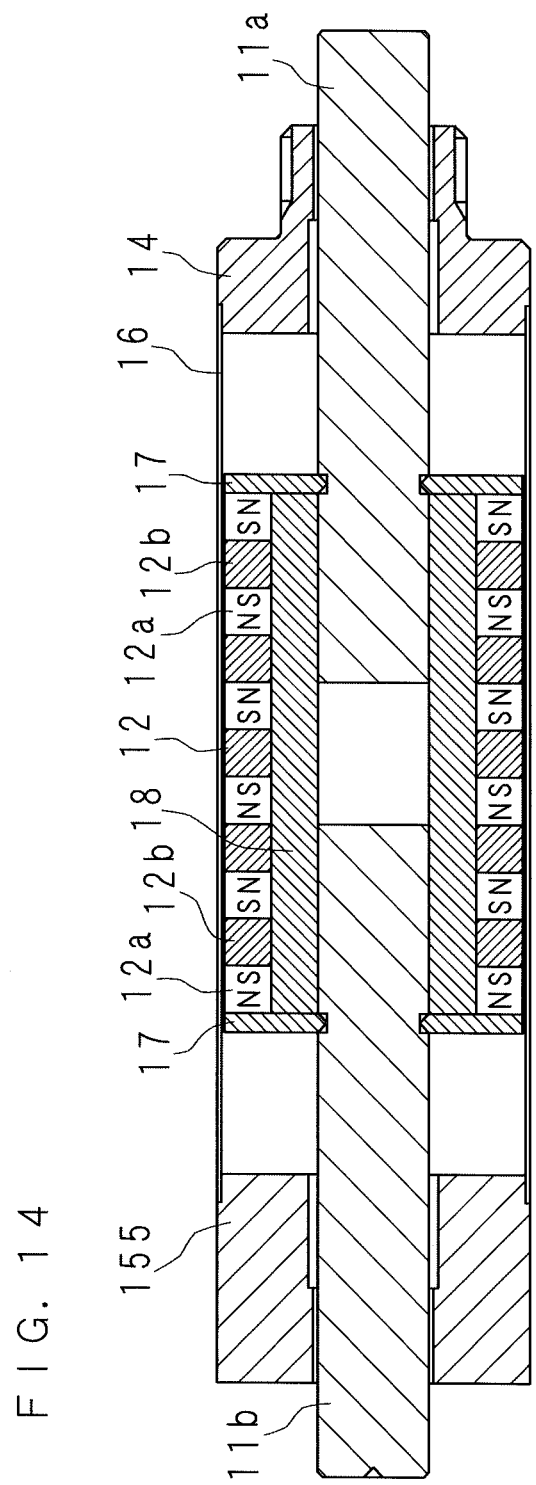
FIG. 14 is a cross-sectional view illustrating a mover unit in another Embodiment E of the present invention.

FIG. 14 is a cross-sectional view illustrating a mover unit in another Embodiment E. In FIG. 14, the similar to or same parts as those in FIG. 3 will be denoted by the same reference numerals.

In the Embodiment E illustrated in FIG. 14, a mover unit 1 has two columnar shafts 11a and 11b. The respective shafts 11a and 11b are formed in the same shape as each other, and have a uniform diameter over the entire area in the axial direction. In the state in which the end parts face apart from each other at a suitable distance, the two shafts 11a and 11b are disposed with the same center axis as each other. A cylindrical member 18, which is made of a non-magnetic material, for example, aluminum, and has the magnetic field part 12 including the permanent magnets 12a and the yokes 12b adhered thereon, is provided in the center part of the mover unit 1 in the axial direction thereof. In addition, as similar to Embodiments B to D, both end faces of the magnetic field part 12 and the cylindrical member 18 are locked by the locking members 17 and 17. Further, grooves are formed in the shafts 11a and 11b at places corresponding to the locking members 17 and 17, and by caulking the portions of the grooves, the shafts 11a and 11b, the magnetic field part 12, the locking members 17 and 17 and the cylindrical member 18 are integrally fixed to each other. Furthermore, the shafts 11a and 11b and the locking members 17 and 17 may be integrally fixed to each other by bonding while allowing plastic flowing therebetween. The other configuration of the bearing part 14 and the cylindrical body 16 is similar to the above-described embodiments. In addition, the configuration of the bearing part 155 is the same as Embodiment A.

Also in Embodiment E illustrated in FIG. 14, as similar to the above-described Embodiments B to D, even in the processing during the line process, it is possible to accurately process the portions of the shafts 11a and 11b facing the bearing parts 14 and 155, and to thus allow mass production. Furthermore, the two shafts 11a and 11b having the same shape as each other may not necessarily required, but by forming in the same shape as each other, it is possible to increase manufacturing yield and reduce the costs.

Furthermore, in the above-described embodiments, the configuration in which the plurality of core element plates are fixed using the pins is exemplified, but it is not limited thereto, and the core may be configured in such a manner that a plurality of core element plates are overlapped and adhered to each other by using an adhesive. In addition, the core having the cylindrical opening is exemplified, but the core having a rectangle tubular opening may be used. The mover is not limited to the columnar shape, and it may have a prism shape. In addition, the bearing part has the bush, but it is possible to configure so as to use a bearing which functions as the bearing member in place of the bush.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. An actuator, comprising:
a stator comprising a core having a tubular opening and coils wound on two opposed portions of the core with the tubular opening interposed therebetween;
a mover inserted into the core, wherein the mover has a columnar shaft body and a plurality of permanent magnets provided on a peripheral surface side of the shaft body, and at least one end part of the shaft body is supported in a case body through a bearing part; and
a non-magnetic cylindrical body which houses a portion of the shaft body and the permanent magnets,
wherein the cylindrical body and the bearing part are connected with each other,
wherein the stator includes a plurality of first core element plates each of which is formed by overlapping a plurality of magnetic plates and a plurality of second core element plates each of which is formed by overlapping a plurality of magnetic plates, and the first core element plate and the second core element plate are alternately laminated one by one with turning in direction by 90 degrees, and
wherein a third core element plate, in which a restraining member of non-magnetic material for restraining the magnetic plates from being opened is assembled, is provided between the adjacent first and second core element plates.

2. The actuator according to claim 1,
wherein the bearing part has a bush.

3. The actuator according to claim 1,
wherein the mover has two shaft bodies.

4. The actuator according to claim 1, wherein the restraining member has a length equal to that of an opening portion of the third core element plate and a width half of that of the opening portion of the third core element plate.

5. The actuator according to claim 1, wherein the restraining member has a thickness equal to that of the third core element plate.

6. The actuator according to claim 1, wherein the restraining member has a length equal to that of an opening portion of the third core element plate and a width shorter than that of the opening portion of the third core element plate which provides a hollow portion in the width direction, such that the core has a hollow outer rectangular shape.

7. A method of manufacturing an actuator which comprises a stator comprising a core having a tubular opening and coils wound on two opposed portions of the core with the tubular opening interposed therebetween, and a mover inserted into the core, wherein the mover has a columnar shaft body and a plurality of permanent magnets provided on a peripheral surface side of the shaft body, and at least one end part of the shaft body is supported in a case body through a bearing part, the method comprising steps of:
fixing the stator and the case body with each other; and
inserting a mover unit having the mover, the bearing part, and a non-magnetic cylindrical body which houses a portion of the shaft body and the permanent magnets and is connected with the bearing part, into the opening of the core of the stator fixed to the case body,
wherein the stator includes a plurality of first core element plates each of which is formed by overlapping a plurality of magnetic plates and a plurality of second core element plates each of which is formed by overlapping a plurality of magnetic plates, and the first core element plate and the second core element plate are alternately laminated one by one with turning in direction by 90 degrees, and wherein a third core element plate, in which a restraining member of non-magnetic material for restraining the magnetic plates from being opened is assembled, is provided between the adjacent first and second core element plates.

* * * * *